Jan. 20, 1925.

L. G. MERRITT 1,523,786

CENTERING DEVICE FOR VENEER LATHES

Filed July 9, 1921

Jan. 20. 1925.

L. G. MERRITT 1,523,786

CENTERING DEVICE FOR VENEER LATHES

Filed July 9, 1921     2 Sheets-Sheet 2

INVENTOR
Louis G. Merritt,
BY
Duell, Warfield & Duell.
ATTORNEY

Patented Jan. 20, 1925.

1,523,786

UNITED STATES PATENT OFFICE.

LOUIS G. MERRITT, OF LOCKPORT, NEW YORK.

CENTERING DEVICE FOR VENEER LATHES.

Application filed July 9, 1921. Serial No. 483,414.

*To all whom it may concern:*

Be it known that I, LOUIS G. MERRITT, a citizen of the United States, residing at Lockport, in the county of Niagara and State of New York, have invented certain new and useful Improvements in Centering Devices for Veneer Lathes, of which the following is a full, clear, and exact description, such as will enable others skilled in the art to which it appertains to make and use the same.

This invention relates to a centering device for lathes and more particularly in some of its details to a device for centering logs in veneer lathes preparatory to clamping the same for rotation to cut sheets of veneer therefrom.

It is an object of the invention to provide an improved centering device of the class mentioned for accurately and easily centering logs in a veneer lathe.

Another object is to provide an improved centering device for lathes adapted to accurately center logs of different diameters with respect to the cutting tool, and automatically operative with the latter.

Still another object is to provide an improved centering device for veneer lathes for centering the log with respect to the cutting tool while at the same time avoiding friction between the rotating log and the centering device during the cutting operation.

Another object is to provide an improved lathe centering device of light and rigid construction operating advantageously and being comparatively inexpensive in manufacturing costs.

Other objects will be in part obvious in connection with the following detail description of an illustrative embodiment of the invention and will be in part obvious in connection therewith.

In the accompanying drawings wherein an illustrated but preferred embodiment of the invention is disclosed, Figure 1 is a transverse vertical sectional view of a veneer lathe equipped with the invention, certain parts being shown in the elevation:

Figure 1:
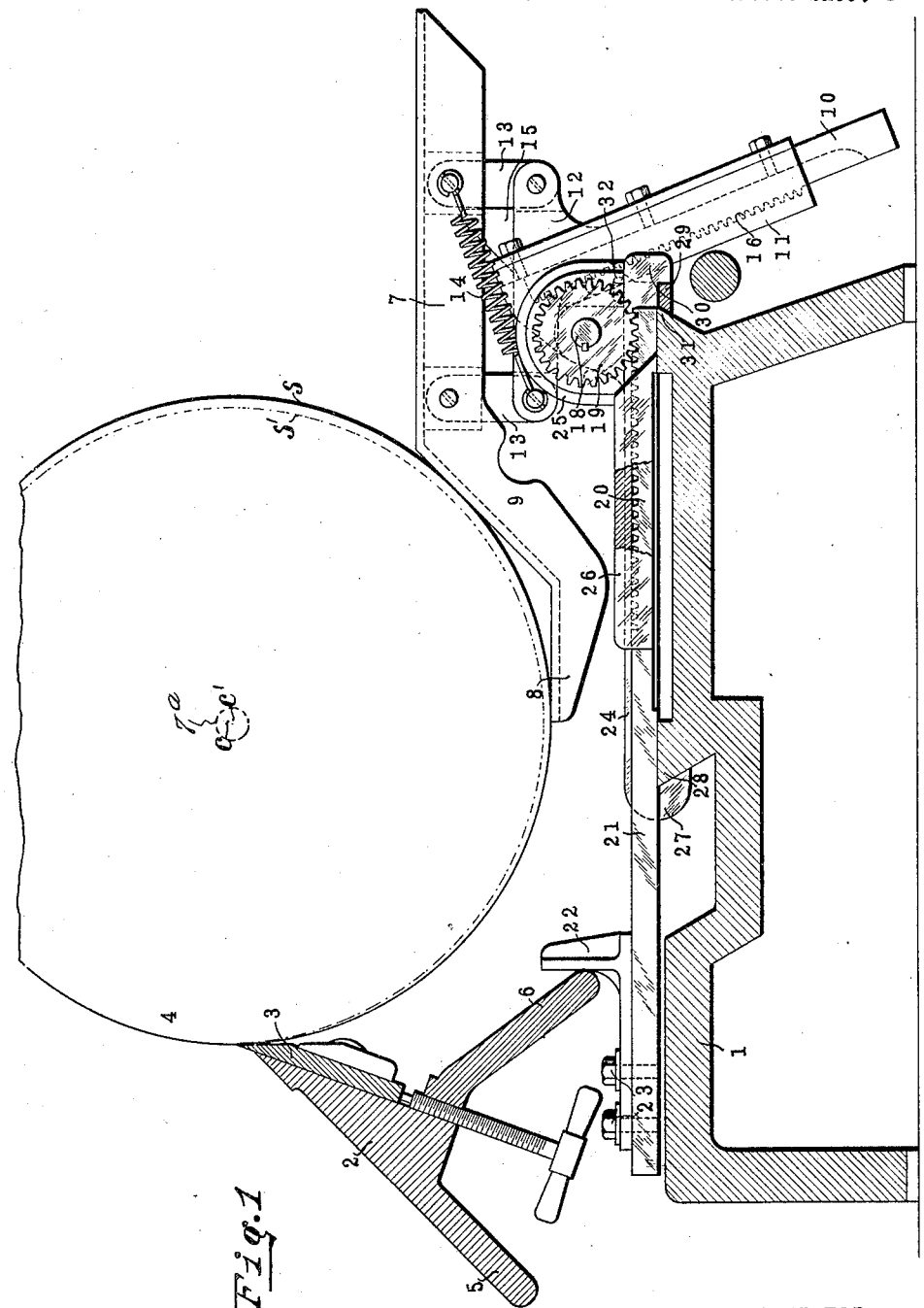
Figure 2:
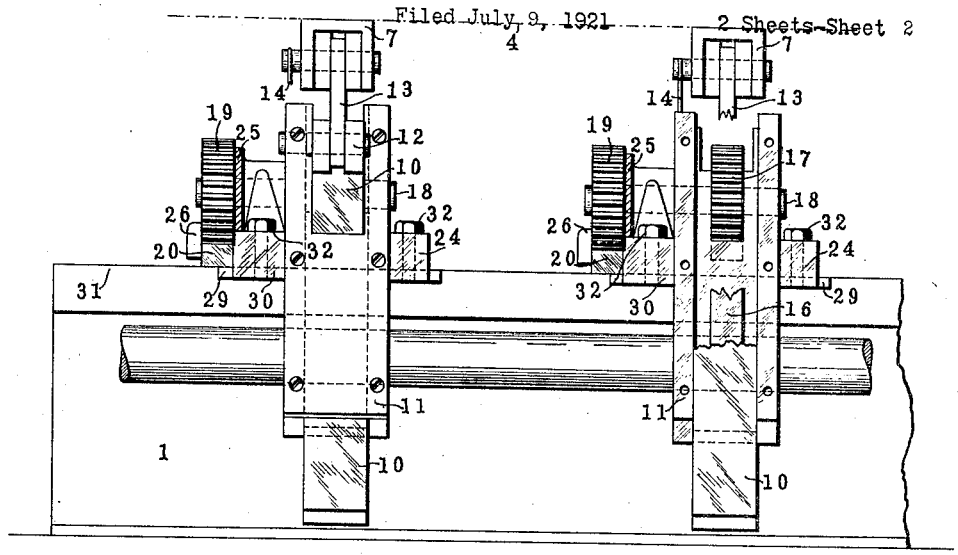
Fig. 2 is a fragmentary rear elevation.
Figure 3:
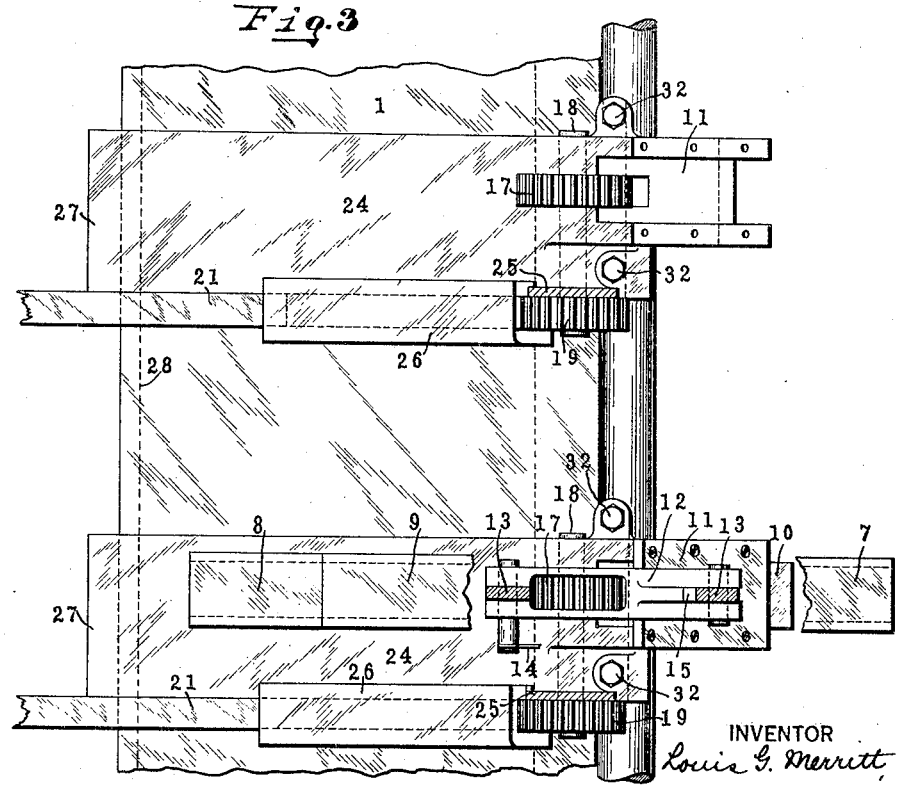
Fig. 3 is a fragmentary plan view certain parts being omitted.

Referring now to the drawing for a detailed description of the embodiment shown, a base 1 preferably of metal is provided, and suitably mounted thereon is a knife bar 2 adapted to adjustably carry a cutting knife 3. The knife bar is mounted on a carriage or other suitable device (not shown) so as to move forwardly and backwardly, toward or away from the work, which in the embodiment shown is a log 4. The knife bar 2 is provided with downwardly extending angularly disposed flanges 5 and 6, the latter of which is adapted to operate the centering mechanism for the log as the knife bar advances.

For supporting the log in correct centered position with respect to the edge of the knife prior to clamping the same for rotation about a longitudinal axis, a pair of centering arms 7 mounted in spaced parallel relationship is provided. Suitable end clamps or dogs, one of which is shown at 7ª in dotted lines in Fig. 1, are provided for engaging the ends of the log to rotatably support the same. The arms 7 are similar in construction being channel-shaped in cross-section with downwardly extending flanges and having two angularly disposed sections 8 and 9, the latter extending downward angularly from the body of the centering arm and the latter being disposed substantially parallel with said body part. The upwardly disposed surfaces of the sections 8 and 9 are adapted to contact with the periphery of the log at spaced portions thereof, supporting the same in centered position with respect to the knife.

Each of the centering arms 7 is carried on a plunger 10 slidably mounted in inclined channel slideways 11 and formed at its upper end with a horizontally disposed T-head 12. At the opposite extremities of this T-head, vertically disposed compression rocker links 13 are pivoted, the upper ends of these links being pivotally secured between the downwardly extending flanges of the centering arms to support the latter in horizontally operative positions. A tension spring 14 is connected at one end to the centering arm and at the other end to the T-head being of sufficient stiffness to support the parts in position when a load is applied thereto, and tensioned to restrain the arm in normal operative position as shown in Fig. 1, but permitting the arm to move backward by pivotal movement of the rocker links. A stop 15 integral with the T-head is disposed to contact with one of the links 13 to limit forward movement of the centering arm. The plunger 10 is provided with a rack bar 16 adapted to mesh with a pinion 17 keyed on a shaft 18 mounted in suitable bearings and carrying also a second pinion 19 keyed thereto. The pinion 19 meshes with a second rack bar 20 operatively connected with a pitman or push bar 21 slidably mounted on the machine. A lug or shoe 22 is adjustably connected by screws 23 to this pitman lying in position to contact with the downwardly extending flange 6 of the knife bar.

The moving parts of the centering mechanism just described are mounted in a base preferably cast in a single piece and having a horizontally extending arm 24 contacting with the planed upper surface of the base 1. The bearings for the shaft 18, a housing 25 for the pinion 19 and the downwardly inclined slideway 11, are all cast integral in one piece with the centering base providing a convenient and rigid unitary structure. A guide or slide 26 is secured to the arm 24 for guiding the longitudinal movement of the rack bar 20 and to support the same in meshing engagement with the pinion 19. The cast base for the centering mechanism is adjustably supported in position by a downwardly and rearwardly inclined lug 27 on the arm 24 which is adapted to engage a forwardly inclined projection 28 formed on the base 1. A gib 29 is employed to engage at the rear end of the arm in a recess formed between a downwardly extending lug 30 thereof and a projection of the frame 1 as shown in Fig. 1. The gib 29 has an inclined surface at its inner edge adapted to cooperate with a reversely inclined surface 31 on the frame 1 and is secured in position by screws 32 threaded into the gib and passing through apertures in the centering base. It will be seen that the centering base is secured to base 1 when placed in position as shown and the gib inserted and forced into sealing position by the screws 32, the inclined engaging surfaces wedging the parts in locked relationship. Each base may be adjusted and spaced as desired relatively to the companion base. It will be understood that two of the centering arms 7 such as described, with connected operating mechanism are preferably employed suitably spaced apart, but one only or more than two may be employed if desired.

The operation of the centering device, which will be largely obvious from the above detailed description, is substantially as follows:—

Preparatory to receiving a log on the centering mechanism the cutting knife is adjusted forwardly or backwardly, according to the size of the log to be received, to give an approximate adjustment. The log is then rolled upon the centering arms 7 resting upon the angularly disposed sections 8 and 9 and against the knife carriage the weight being carried by the links 13. Final adjustment of the centering mechanism is then made by moving the knife carriage forwardly until the periphery of the log contacts therewith and with the surfaces of the angularly disposed sections 8 and 9 of the centering arms. It will be seen that as forward adjustment of the knife is made, the centering arms will be raised, always occupying a definite relative position with respect to the knife so that logs of different diameters may be properly centered. This movement of the centering arms is effected through operation of the rack bars 20 and 16 and co-operating pinions 19 and 17 when the knife moves forwardly toward the log, the flange 6 contacting with the lugs 22 to project the rack bar 20. The operative relationship between the centering arms and knife is therefore always maintained, adjustment for the reception of any size of log being automatically made by a simple adjustment of the knife. As soon as the log is properly centered, which occurs when the periphery thereof contacts with the knife and with sections 8 and 9 of the centering arm, it is clamped in position to rotate toward the edge of the knife, and as rotation thereof continues the knife advances peeling a thin continuous sheet from the log. As the log may have knots or other eccentricities or peripheral protuberances thereon, it will be seen that during the first revolution these protuberances may come into contact with the ends of the centering arms.

To avoid injury to the arms or other parts of the machine under such conditions, and to prevent interference with the free rotation of the log, the resilient mountings provided by links 13 and springs 14 are provided. This construction permits the arm to be retracted against the tension of the spring so that injury to the parts is avoided, and the arm will assume its normal position under the tension of the spring as soon as the obstruction has passed.

To avoid frictional engagement of the periphery of the log with the surfaces of sections 8 and 9 of the centering arms as the turning process continues, the center of the log is slightly displaced by the centering apparatus from the center of rotation thereof when the log is clamped in rotating position; in other words, the circle to which the knife edge and the surfaces of the sections 8 and 9 are tangent, which circle defines the circumference of the log as centered, will be slightly eccentric to the center of rotation of the log. As shown in Fig. 1, the log 4 is supported for rotation by the dogs 7ª at the center of rotation C, while C' indicates the center of the log as centered by the centering apparatus before the cutting begins. The periphery of the log before the cutting begins which may be termed the centering periphery is represented by the full line circle S. When the log is clamped it rotates about the center C, and as soon as the knife has cut once around the log the periphery is then as represented by the dotted line circle S', being out of contact with the centering arms. This dotted line periphery which obtains as soon as the cutting begins may be termed the cutting periphery. This relation exists until the log is completely turned down. There is consequently no dragging or friction of the log upon the centering arms 7.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall there-between.

Having described my invention, what I claim as new and desire to secure by Letters Patent is:

1. In a veneer lathe, in combination, a cutting knife carried by the lathe, means for centering a log with respect to said knife and means for avoiding interference with the rotation of the log when eccentricities thereof contact with the centering device.

2. In a veneer lathe, in combination, a cutting knife carried by the lathe, means for centering a log with respect to said knife and means for supporting the log for the cutting operation so as to terminate the supporting relationship of the centering means upon initiation of the cutting operation.

3. In a veneer lathe, in combination, a cutting knife carried by the lathe, means for centering a log with respect to said knife, means whereby the position of the centering means is dependent upon the position of the knife, and means for avoiding interference with the rotation of the log when eccentricities thereof contact with the centering device.

4. In a veneer lathe, in combination, a cutting knife carried by the lathe, means for centering a log with respect to said knife, means whereby the position of the centering means is dependent upon the position of the knife and means for supporting the log for the cutting operation whereby frictional engagement of the centering means with the log is avoided when the cutting operation begins.

5. In a veneer lathe, in combination, a cutting knife carried by the lathe, means for centering a log with respect to said knife, means for preventing interference with the rotation of the log when eccentricities thereof contact with the centering device and means for supporting the log for the cutting operation whereby frictional engagement of the centering means with the log is avoided when the cutting operation begins.

6. In a veneer lathe, in combination, a cutting knife carried by the lathe, means for centering a log with respect to said knife, means whereby the position of the centering means is dependent upon the position of the knife, means for avoiding interference with the rotation of the log when eccentricities thereof contact with said centering device and means for supporting the log for the cutting operation whereby frictional engagement of the centering means with the log is avoided when the cutting operation begins.

7. In a veneer lathe, in combination, a cutting knife carried by the lathe, a centering member for supporting and centering a log with respect to said knife, said centering member being arranged with reference to the knife so the log may be introduced from above into contacting position with said member and said knife to center the same, and means for varying the position of the centering member when the position of said knife is varied.

8. In a veneer lathe, in combination, a cutting knife carried by the lathe, a centering arm for supporting and centering a log with respect to said knife, means for varying the position of the centering arm when the position of said knife is varied and resilient means for permitting said arm to be retracted.

9. In a veneer lathe, in combination, a cutting knife carried by the lathe, a centering arm for supporting and centering a log with respect to said knife, means for varying the position of the centering arm when the position of said knife is varied, and means for supporting the log for the cutting operation so as to terminate the contact of said arm with the log when the cutting operation begins.

10. In a veneer lathe, in combination, a cutting knife carried by the lathe, a centering arm for supporting and centering a log with respect to said knife, means for varying the position of the centering arm when the position of said knife is varied, resilient means for permitting said arm to be retracted and means for supporting the log for the cutting operation so as to terminate the contact of said arm with the log when the cutting operation begins.

11. In a veneer lathe, in combination, a cutting knife, a centering device adapted to contact with the log to center the same with respect to the knife, the periphery of said log in contact with said device during centering being eccentric to the cutting periphery of the log.

12. In a veneer lathe, in combination, a cutting knife, a centering device comprising an arm adapted to contact with the log to center the same with respect to the knife, the periphery of said log in contact with said arm during centering being eccentric to the cutting periphery of the log, and means for avoiding injury to the centering device or interference with the rotation of the log by projections on the surface of the latter.

13. In a veneer lathe, in combination, a cutting knife, a centering device comprising an arm adapted to contact with the log to center the same with respect to the knife, the periphery of said log in contact with said arm during centering being eccentric to the cutting periphery of the log, and means dependent upon the position of said knife for varying the position of said arm.

14. In a veneer lathe, in combination, a cutting knife, a centering device comprising an arm adapted to contact with the log to center the same with respect to the knife, the periphery of said log in contact with said arm during centering being eccentric to the cutting periphery of the log, means dependent upon the position of said knife for varying the position of said arm, and means for permitting retraction of said arm when contacted by projections on the log.

15. In a veneer lathe, in combination, a cutting knife carried by the lathe, a centering member for supporting and centering a log with respect to said knife, said centering member being arranged with reference to the knife so the log may be introduced from above into contacting position with said centering member and said knife, said centering member and knife providing a three-point contact with the log for centering it in cutting position, and means for varying the position of the centering member when the position of said knife is varied.

16. In a lathe, in combination, a knife, a centering arm for supporting a log in centered position with respect to said knife and a plunger adapted to carry said arm.

17. In a lathe, in combination, a knife, a centering arm for supporting a log in centered position with respect to said knife, a plunger adapted to carry said arm and means to cause longitudinal movement of said plunger to vary the position of said arm.

18. In a lathe, in combination, a knife, a centering arm for supporting a log in centered position with respect to said knife, a plunger, and means for resiliently mounting said arm on said plunger.

19. In a lathe, in combination, a cutting tool, a centering device operatively connected thereto, and means for avoiding injury to said centering device by projections on the surface of a centered log.

20. In a lathe, in combination, a cutting tool, a centering arm for supporting a log in centered position with respect to said tool, a plunger, and a link for mounting said arm upon said plunger.

21. In a lathe, in combination, a cutting tool, a centering arm for supporting a log in centered position with respect to said tool, a plunger, a link for mounting said arm upon said plunger, and resilient means for holding said arm in normal operative position.

22. In a centering device for lathes, in combination, centering mechanism for the lathe, and a base for said centering mechanism movable longitudinally of the lathe and having clamping means for securing the same to the lathe.

23. In a centering device for lathes, in combination, a base with a centering device having an arm adapted to be adjustably clamped to the lathe, and a rigidly connected angularly disposed arm adapted to support a movable member of the centering device.

24. In a centering device for lathes, in combination, a base for the centering device, including an integral casting having a horizontal arm adapted to be clamped to the lathe, an angularly disposed arm, rack bars carried by said arms and means mounted in said casting to transmit motion between said rack bars.

25. In a lathe, in combination, a cutting knife carried by the lathe, means for centering the work with respect to said knife, and being adjustable to center different sized work and to receive the same for supporting in centered relationship subsequently to adjustment thereof, and means for automatically maintaining the operative position of the centering means with respect to said knife.

26. In a lathe, in combination, a cutter, and a centering device controlled by the cutter to move radially of the work in synchronism with the movement of the cutter and on a line intersecting the line of movement of the cutter at an obtuse angle.

In testimony whereof I affix my signature, in the presence of two witnesses.

LOUIS G. MERRITT.

Witnesses:
WALLACE G. CAMPBELL,
B. GERTRUDE WOODBURN.